(12) United States Patent
Ward et al.

(10) Patent No.: US 8,992,274 B1
(45) Date of Patent: Mar. 31, 2015

(54) SYSTEMS AND METHODS FOR MANUALLY OPERATING HYBRID PROPULSION AND REGENERATION SYSTEMS FOR MARINE VESSELS

(75) Inventors: Aaron J. Ward, Oshkosh, WI (US); Brett J. McNalley, Hartford, WI (US)

(73) Assignee: Brunswick Corporation, Lake Forest, IL (US)

( * ) Notice: Subject to any disclaimer, the term of this patent is extended or adjusted under 35 U.S.C. 154(b) by 221 days.

(21) Appl. No.: 13/524,172

(22) Filed: Jun. 15, 2012

(51) Int. Cl.
*B63H 21/22* (2006.01)
*B63H 21/20* (2006.01)

(52) U.S. Cl.
CPC ...................................... *B63H 21/20* (2013.01)
USPC ..................................... 440/87; 440/1; 440/3

(58) Field of Classification Search
CPC .. B06W 20/10; B06W 20/20; B06W 20/1088
USPC ...................... 440/1, 3, 6, 84, 86; 701/21, 22; 180/65.285
See application file for complete search history.

(56) References Cited

U.S. PATENT DOCUMENTS

| | | | |
|---|---|---|---|
| 1,332,631 | A | 3/1920 | Morse |
| 1,633,454 | A | 6/1927 | Mills |
| 3,230,698 | A | 1/1966 | Nettles |
| 3,503,464 | A | 3/1970 | Yardney |
| 3,566,717 | A | 3/1971 | Baruch et al. |
| 3,650,345 | A | 3/1972 | Yardney |
| 3,703,642 | A | 11/1972 | Balaguer |
| 3,888,325 | A | 6/1975 | Reinbeck |
| 4,233,858 | A | 11/1980 | Rowlett |
| 4,338,525 | A | 7/1982 | Kilgore |
| 5,080,064 | A | 1/1992 | Buslepp et al. |
| 5,081,365 | A | 1/1992 | Field et al. |
| 5,301,764 | A | 4/1994 | Gardner |

(Continued)

FOREIGN PATENT DOCUMENTS

| | | |
|---|---|---|
| DE | 101 53 586 A1 | 5/2002 |
| DE | 103 18 293 A1 | 11/2004 |

OTHER PUBLICATIONS

Web Page for PowerCharge Battery Charger HV Series—Overview; http://www.powerdesignersusa.com/powercharge_hv.htm, last visited Jan. 27, 2011 (one page).

(Continued)

*Primary Examiner* — S. Joseph Morano
*Assistant Examiner* — Andrew Polay
(74) *Attorney, Agent, or Firm* — Andrus Intellectual Property Law, LLP

(57) ABSTRACT

A hybrid propulsion system for a marine vessel having a first marine propulsor that propels the marine vessel, a first internal combustion engine that selectively powers the first marine propulsor, and a first electric motor that selectively powers the first marine propulsor. The system also has first and second user input devices and a control circuit that controls operation of the system in at least a first control mode and a second control mode. In the first control mode, the control circuit controls operation of both the first internal combustion engine and the first electric motor based upon actuation of the first user input device. In the second control mode, the control circuit controls operation of the first internal combustion engine based upon actuation of the first user input device and the control circuit controls operation of the first electric motor based upon actuation of the second user input device.

6 Claims, 5 Drawing Sheets

(56) References Cited

U.S. PATENT DOCUMENTS

| | | |
|---|---|---|
| 5,616,056 A | 4/1997 | Meissner |
| 5,835,876 A | 11/1998 | Hathaway et al. |
| 5,848,582 A | 12/1998 | Ehlers et al. |
| 5,880,575 A | 3/1999 | Itou et al. |
| 5,969,624 A | 10/1999 | Sakai et al. |
| 6,009,371 A | 12/1999 | Kobayashi |
| 6,133,707 A | 10/2000 | Kikuchi et al. |
| 6,396,161 B1 | 5/2002 | Crecelius et al. |
| 6,443,286 B1 | 9/2002 | Bratel et al. |
| 6,517,464 B2 | 2/2003 | Yamazaki et al. |
| 6,554,088 B2 | 4/2003 | Severinsky et al. |
| 6,587,765 B1 | 7/2003 | Graham et al. |
| 6,662,742 B2 | 12/2003 | Shelton et al. |
| 6,701,890 B1 | 3/2004 | Suhre et al. |
| 6,757,606 B1 | 6/2004 | Gonring |
| 6,758,198 B1 | 7/2004 | Suhre et al. |
| 6,800,004 B1 | 10/2004 | White et al. |
| 6,821,171 B1 | 11/2004 | Wynveen et al. |
| 6,857,918 B1 | 2/2005 | Lebreux et al. |
| 6,882,129 B2 | 4/2005 | Boskovitch et al. |
| 6,915,781 B2 | 7/2005 | Rayl |
| 6,919,711 B2 | 7/2005 | Haydock et al. |
| 6,978,617 B2 | 12/2005 | Goldmeer et al. |
| 6,982,632 B2 | 1/2006 | Nagasaka et al. |
| 7,147,523 B2 | 12/2006 | Mori |
| 7,241,192 B2 | 7/2007 | Andersen et al. |
| 7,287,443 B2 | 10/2007 | Kuhstrebe et al. |
| 7,296,648 B2 | 11/2007 | Tatara et al. |
| 7,318,396 B1 | 1/2008 | Belter et al. |
| 7,473,148 B2 * | 1/2009 | Ichikawa et al. ............. 440/6 |
| 7,473,149 B2 | 1/2009 | Mizokawa |
| 7,482,767 B2 | 1/2009 | Tether |
| 7,518,344 B2 | 4/2009 | Sihler |
| 7,530,864 B2 | 5/2009 | Kaji |
| 7,556,547 B2 | 7/2009 | Kaji |
| 7,565,939 B2 | 7/2009 | Ando et al. |
| 7,621,789 B2 | 11/2009 | Mizokawa |
| 7,769,504 B2 * | 8/2010 | Kaji ............................. 701/21 |
| 7,808,211 B2 | 10/2010 | Pacholok et al. |
| 7,862,393 B2 | 1/2011 | Levander et al. |
| 8,039,976 B2 | 10/2011 | Sato et al. |
| 8,062,081 B2 | 11/2011 | Barrett et al. |
| 8,290,682 B2 | 10/2012 | Ewert et al. |
| 8,436,583 B2 | 5/2013 | Guang et al. |
| 8,453,772 B2 * | 6/2013 | Brown ................ 180/65.285 |
| 2002/0005178 A1 | 1/2002 | Iwatani et al. |
| 2004/0163861 A1 | 8/2004 | Fukuda et al. |
| 2005/0106953 A1 | 5/2005 | Andersen et al. |
| 2006/0025025 A1 | 2/2006 | Kitani et al. |
| 2006/0040791 A1 | 2/2006 | Nakajima et al. |
| 2006/0096555 A1 | 5/2006 | Buck |
| 2006/0166573 A1 | 7/2006 | Vetta et al. |
| 2007/0062744 A1 | 3/2007 | Weidenheimer et al. |
| 2008/0041327 A1 | 2/2008 | Lewis et al. |
| 2008/0120516 A1 | 5/2008 | Thor |
| 2008/0195287 A1 | 8/2008 | Janssen et al. |
| 2009/0156068 A1 * | 6/2009 | Barrett et al. ................ 440/3 |
| 2009/0176417 A1 | 7/2009 | Rembach et al. |
| 2009/0284228 A1 | 11/2009 | Kumar |
| 2009/0288896 A1 | 11/2009 | Ichikawa |
| 2009/0302616 A1 | 12/2009 | Peterson |
| 2010/0075798 A1 | 3/2010 | Suzuki et al. |
| 2010/0105259 A1 | 4/2010 | Wejrzanowski et al. |
| 2010/0123436 A1 | 5/2010 | Herrod et al. |
| 2010/0125383 A1 | 5/2010 | Caouette |
| 2010/0144219 A1 | 6/2010 | Balogh et al. |
| 2010/0250041 A1 | 9/2010 | Li |
| 2011/0021313 A1 | 1/2011 | Steinborn et al. |
| 2011/0195618 A1 | 8/2011 | Arbuckle et al. |
| 2011/0237141 A1 * | 9/2011 | Tamba ........................... 440/3 |
| 2013/0274969 A1 | 10/2013 | Wang et al. |

OTHER PUBLICATIONS

Web Page for PowerCharge Battery Charger HV Series—Specifications; http://www.powerdesignersusa.com/powercharge_hv_specs.htm, last visited Jan. 27, 2011 (two pages).

Brochure Page For PowerCharge Battery Charger HV Series and PowerCharge HV Series Product Matrix (two pages).

* cited by examiner

US 8,992,274 B1

SYSTEMS AND METHODS FOR MANUALLY OPERATING HYBRID PROPULSION AND REGENERATION SYSTEMS FOR MARINE VESSELS

FIELD

The present disclosure relates to hybrid marine vessels, and particularly to propulsion and regeneration systems and methods for hybrid marine vessels.

BACKGROUND

A typical marine vessel has one or more internal combustion engines that drive a propulsor, such as for example a propeller, impeller, pod drive and/or the like. The one or more internal combustion engines provide thrust necessary to propel the vessel. Some marine vessels also include one or more electric motors, which are typically battery-powered motors.

U.S. patent application Ser. No. 13/100,037, expressly incorporated herein by reference, discloses systems and methods of operating a marine propulsion system utilizing an internal combustion engine and an electric motor that is powered by a battery, wherein the internal combustion engine and the electric motor each selectively power a marine propulsor to propel a marine vessel. A control circuit is operated to control operation of the system according to a plurality of modes including at least an electric mode wherein the electric motor powers the marine propulsor and a hybrid mode wherein the internal combustion engine powers the marine propulsor and provides power for recharging the battery. An operator-desired future performance capability of the hybrid marine propulsion system is input to the control circuit, which selects and executes the plurality of modes so as to provide the operator-desired desired future performance capability.

SUMMARY

The present disclosure provides a hybrid propulsion system for a marine vessel. The system has a first marine propulsor that propels the marine vessel, a first internal combustion engine that selectively powers the first marine propulsor, and a first electric motor that selectively powers the first marine propulsor. The system also has first and second user input devices and a control circuit that controls operation of the system in at least a first control mode and a second control mode. In the first control mode, the control circuit controls operation of both the first internal combustion engine and the first electric motor based upon actuation of the first user input device. In the second control mode, the control circuit controls operation of the first internal combustion engine based upon actuation of the first user input device and the control circuit controls operation of the first electric motor based upon actuation of the second user input device.

The present disclosure also provides a method of operating a marine propulsion system having a first internal combustion engine and a first electric motor, wherein the first internal combustion engine and the first electric motor each selectively power a first marine propulsor to propel a marine vessel. The method includes controlling operation of the system with a control circuit based on actuation of first and second user input devices, controlling both the first internal combustion engine and the first electric motor based on actuation of the first user input device when the control circuit is in a first control mode, and controlling the first internal combustion engine based on actuation of the first user input device and controlling the first electric motor based on actuation of the second user input device when the control circuit is in a second control mode.

DETAILED DESCRIPTION OF THE DRAWINGS

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
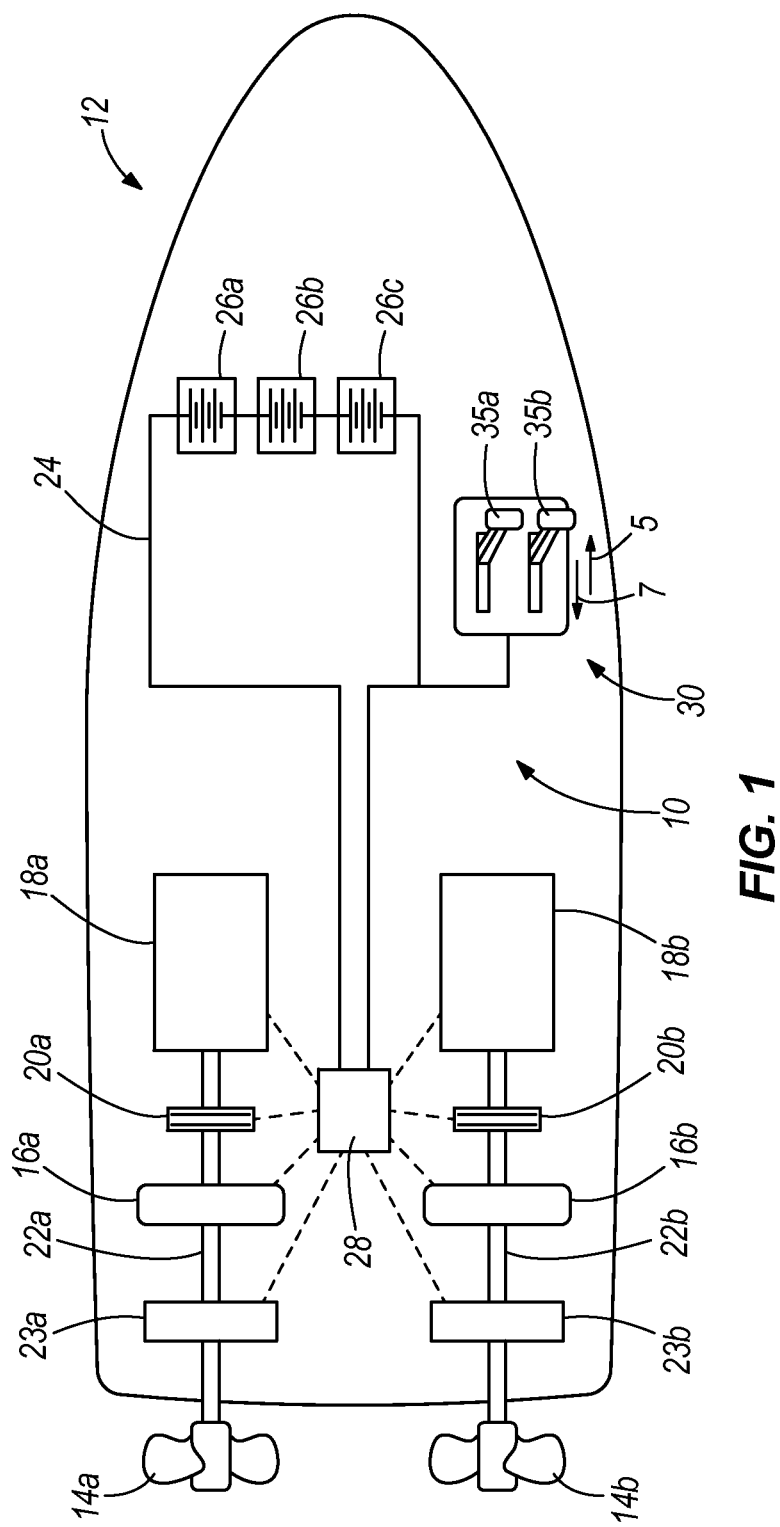
FIG. 1 is a schematic view of an exemplary marine vessel and propulsion system.

FIG. 1 depicts a hybrid marine propulsion system 10 for a marine vessel 12. The system 10 includes among other things one or more propulsors 14a, 14b (collectively referred to herein as "propulsors"), which can include any type of device for propelling the marine vessel 12 including but not limited to one or more propellers (as shown in FIG. 1), impellers, stern drives, pod drives, and/or the like. The propulsors 14a, 14b are selectively driven by one or more electric motors 16a, 16b (collectively referred to herein as "motors"), one or more internal combustion engines 18a, 18b (collectively referred to herein as "engines"), and a combination of the electric motors 16a, 16b and engines 18a, 18b. In the example shown, the system 10 also includes one or more clutches 20a, 20b (collectively referred to herein as "clutches") for selectively connecting and disconnecting the engines 18a, 18b from driveshafts 22a, 22b that extend from the engines 18a, 18b to transmissions 23a, 23b for driving the propulsors 14a, 14b. The engines 18a, 18b can include diesel engines or any other type of engine for providing power to the propulsors 14. The clutches 20a, 20b can include any type of clutch for connecting and disconnecting the engines 18a, 18b and driveshafts 22a, 22b, such as for example friction clutches, or more preferably dog clutches because the speeds of the motors 16a, 16b and engines 18a, 18b are typically synchronized (i.e. substantially matched) before the clutches 20a, 20b are engaged or disengaged.

The motors 16a, 16b are located between the clutches 20a, 20b and transmissions 23a, 23b and are configured to drive driveshafts 22a, 22b at the same time or separately from the engines 18a, 18b. In the example shown, the driveshafts 22a, 22b extend through and form a part of the motors 16a, 16b; however, arrangements where the motors 16a, 16b and driveshafts 22a, 22b are oriented differently with respect to each other or are separate components that are operatively connected are also contemplated and are part of this disclosure. Together, the engines 18a, 18b, clutches 20a, 20b, motors 16a, 16b and transmissions 23a, 23b provide forward, neutral, and reverse operations of the propulsors 14a, 14b in a "parallel" drive arrangement; however it should be recognized that the examples shown and described are not limiting and that the concepts discussed and claimed herein are applicable to other types of parallel and non-parallel hybrid marine propulsion configurations.

The system 10 further includes a plurality of rechargeable storage batteries 26a, 26b, 26c, which are connected in electrical communication with the motors 16a, 16b and discharge current to power the motors 16a, 16b. In FIG. 1, three batteries 26a, 26b, 26c are shown connected in series with each other and to system 10; however the number of batteries 26 and the configuration thereof can vary from that shown. One or more batteries could be employed.

In one exemplary arrangement, the motors 16a, 16b are also operable as generators to recharge the batteries 26. In this mode, referred to hereinbelow as Hybrid Regeneration Mode, the motors 16 are connectable in torque transmitting relation with, and driven by, the engines 18a, 18b, which in turn provide a supply of current for recharging batteries 26a, 26b, 26c. However, the motors 16a, 16b do not need to provide the generation source for the batteries and an alternate generator that receives power from the engine(s) could be employed.

Figure 2:
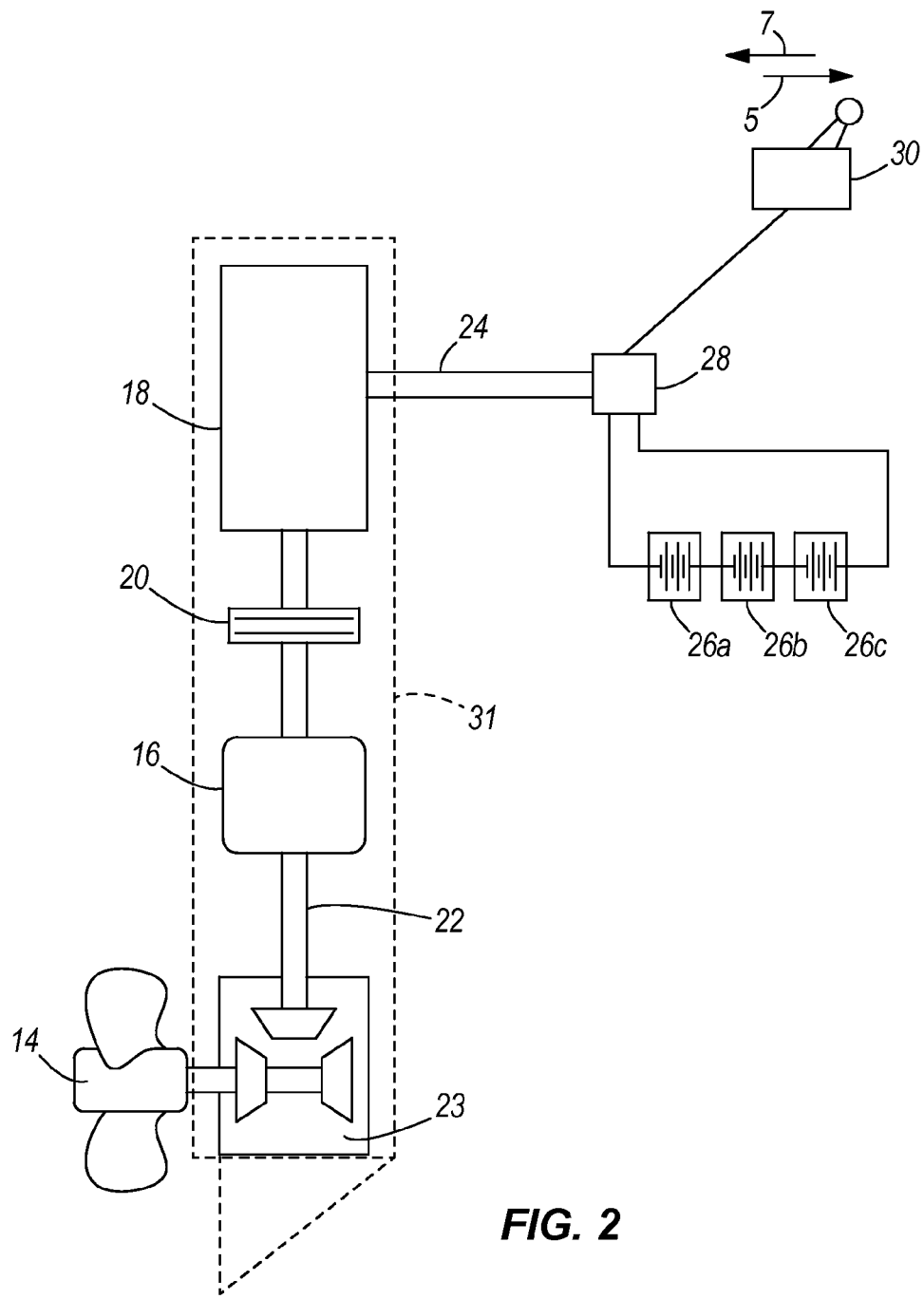
FIG. 2 is a schematic view of another exemplary marine vessel and propulsion system.

FIG. 1 depicts an inboard/outboard marine arrangement; however the concepts disclosed in this application are applicable to any type of marine propulsion system, such as for example an outboard motor arrangement. FIG. 2 depicts an outboard motor 31 according to such an arrangement, having reference numbers corresponding to the structures described with reference to FIG. 1. The principles disclosed above equally apply to the configuration shown in FIG. 2. For example, the system 10 could include two outboard motors 31.

Figure 3:
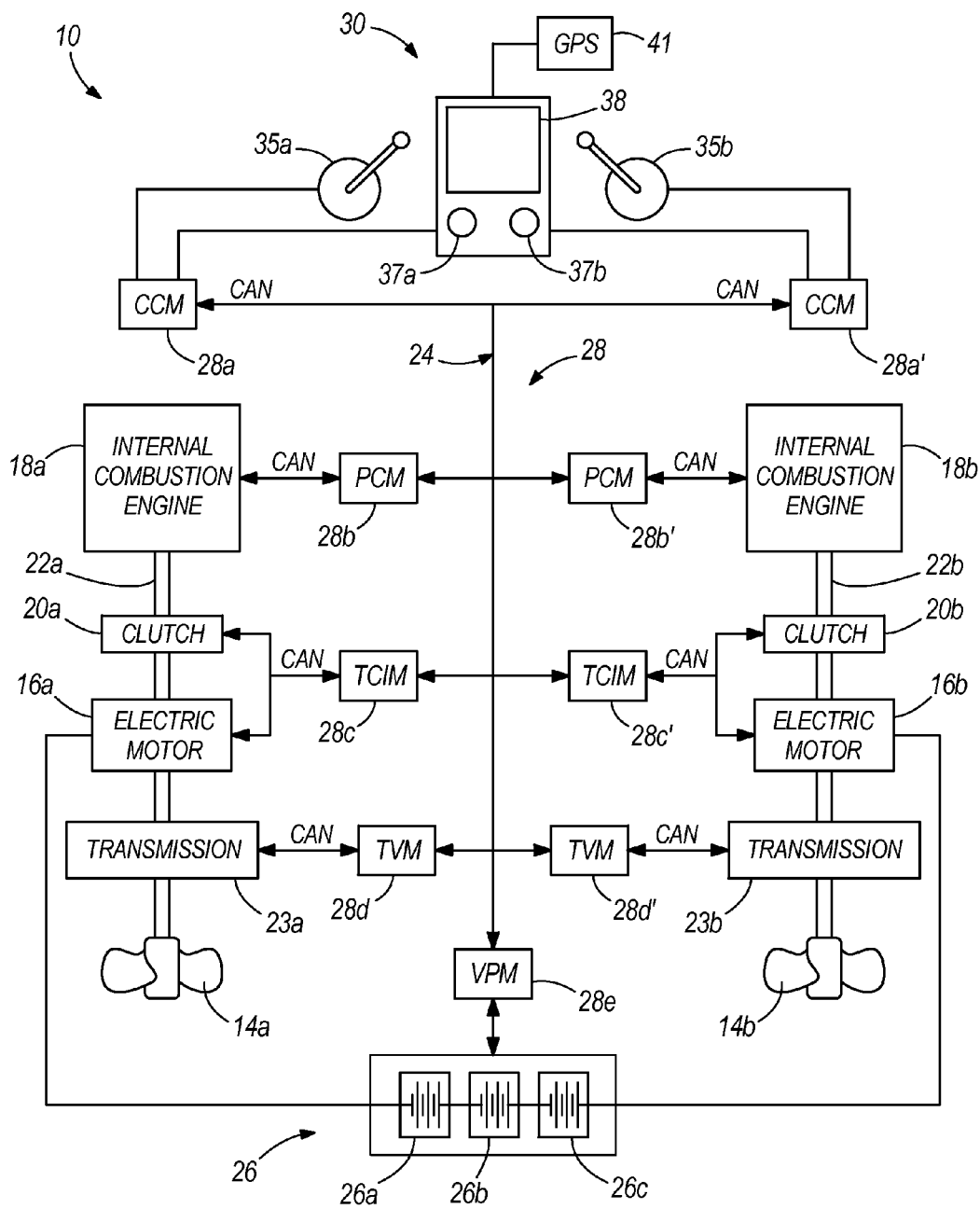
FIG. 3 is a schematic view of a hybrid marine propulsion system.

Referring to FIG. 3, the system 10 also includes a control circuit 28 having a programmable processor and optionally having a memory. The control circuit 28 comprises a controller area network 24 (CAN) for operating the system 10 in a plurality of operational modes. The control circuit 28 is shown schematically and includes a plurality of control circuit sections 28a-28e, 28a'-28d', each section optionally having a memory and processor for sending and receiving electronic control signals, for communicating with other control circuits in the CAN 24, and for controlling operations of certain components in the system 10 such as the engines 18a, 18b, clutches 20a, 20b, and motors 16a, 16b. The programming and operations of the control circuit 28 and its sections 28a-28e, 28a'-28d', are described in further detail below with respect to non-limiting examples and/or algorithms. While each of these examples/algorithms includes a specific series of steps for accomplishing certain system control functions, the scope of this disclosure is not intended to be bound by the literal order or literal content of steps described herein, and non-substantial differences or changes still fall within the scope of the disclosure. Also, the configuration of the control circuit 28 and sections 28a-28e, 28a'-28d', can vary significantly. For example, the control circuit 28 does not need to include separately located sections and can instead comprise a single control device located at one location and excluding the CAN 24. Conversely the control circuit 28 can include more sections than those shown and sections located at different locations than those shown and interconnected by a CAN or other communication link, which can be wired or wireless.

In the example shown, the control circuit 28 includes command control sections 28a, 28a' (CCM) that are configured to receive user inputs via the CAN 24 from a user interface 30. The user interface 30 is shown in FIG. 1 as conventional combination throttle/shift levers 35a, 35b and in FIG. 3 as including a plurality of mode selection buttons 37a, 37b and a display/touch screen 38; however, the user interface 30 is not limited to these configurations and can additionally or alternatively comprise other devices for inputting commands to the system 10, such as fewer or more input buttons and/or keys than that shown, joysticks, touch screens, and/or the like. Actuation of the user interface 30 is sensed by conventional sensors (not shown) and communicated to command control sections 28a, 28a' via the CAN 24.

The command control sections 28a, 28a' are programmed to convert the user inputs into electronic commands and then send the commands to other control circuit sections in the system 10. In this example, the other control circuit sections include transmission/engine control circuits (PCM) 28b, 28b' that control engine/transmission/shifting and read signals regarding transmission state and output speed; thermal, clutch motor interface modules (TCIM) 28c, 28c' that control the cooling system, clutches 20a, 20b, and provide communication interface between the CAN 24 and a control circuit section (not shown) for the motors 16a, 16b; and drive control modules (TVM) 28d, 28d' that receive commands from the CCM 28a, 28a' and control for example a pod drive to a particular steering angle. Again, the control circuit 28 shown in FIG. 3 is exemplary and could be significantly changed and still fall within the scope of the present disclosure and achieve the system's functional activities set forth herein.

During operation of the marine vessel 12, the control circuit 28 is programmed to switch amongst at least three modes of control, namely (1) an Engine Mode, wherein the engines 18a, 18b are connected to the propulsors 14a, 14b by the clutches 20a, 20b and all of the driving force to the propulsors 14a, 14b is provided by the engines 18a, 18b; (2) an Electric Mode, wherein the motors 16a, 16b are connected to the propulsors 14a, 14b and all of the driving force to the propulsors 14a, 14b is provided by the motors 16a, 16b; and (3) a Hybrid Mode, including either or both of a Hybrid Assist Mode wherein both the engines 18a, 18b and the motors 16a, 16b are connected to the propulsors 14a, 14b, respectively, and the driving force to the propulsors 14a, 14b is provided by a combination of the engines 18a, 18b and the motors 16a, 16b, and a Hybrid Regeneration Mode wherein the motors 16a, 16b are controlled to perform as generators, thereby providing recharge current to the batteries 26a, 26b, 26c. The latter situation occurs, for example, when both the motors 16a, 16b and engines 18a, 18b are connected in parallel via the respective driveshafts 22a, 22b. Which mode of operation is utilized at any given time can be based upon user inputs provided by the user interface 30, and/or specific operating conditions of the vessel 12, as described further herein below.

The system 10 disclosed herein is configured to provide switching between the various modes of operation while the engines 18a, 18b are running and/or while the motors 16a, 16b are running and with the propulsors 14a, 14b in neutral or in gear. For example, it is often desirable to switch into Electric Mode when operating the vessel 12 at low speeds to thereby provide quieter vessel operation and more fuel-efficient vessel operation. It is often desirable to switch into Hybrid Regeneration Mode when the power of the plurality of batteries 26a, 26b, 26c is low to thereby draw recharging current from the engines 18a, 18b.

The marine vessel 12 can also include at least one GPS receiver 41, for example provided at the user interface 30. The GPS receiver 41 optionally can have its own microprocessor having computer readable medium and executable code, as well as a memory. The GPS receiver 41 is configured to receive GPS satellite signals and calculate the current global position of the marine vessel 12, as well as the current speed of the marine vessel in terms of speed over ground (SOG) and course over ground (COG) and communicate this information to the control circuit 28.

The control circuit 28 is also configured to display on the display/touch screen 38, for example located at the user interface 30, information regarding the current global position and operational characteristics of the marine vessel 12. Alternately, the control circuit 28 could be configured to display the information on another display such as a standard video display and/or the like. The type of display can vary and is not critical.

Two mode selection buttons are provided, namely a Hybrid Mode Selection Button 37a and a Single Lever Mode Selection Button 37b. As used herein, the term "button" also encompasses switches, touch screen icons, levers, and/or the like. Both of the buttons 37a, 37b can be provided at the user interface 30. If neither of these buttons 37a, 37b is selected, then the marine vessel 12 operates in Engine Mode, and each of engines 18a, 18b is controlled by the control circuit 28 based upon inputs to each of the throttle/shift levers 35a, 35b, respectively. For example, the port engine 18a provides power to the port propulsor 14a based on inputs to the port throttle/shift lever 35a. Similarly, the starboard engine 18b provides power to the starboard propulsor 14b based on inputs to the starboard throttle/shift lever 35b.

If the Single Lever Mode Selection Button 37b is selected, the control circuit 28 will control operation of both of the engines 18a, 18b based upon actuation of a single throttle/shift lever 35a or 35b. For example, the control circuit 28 will cause the port engine 18a and starboard engine 18b to provide power to the port and starboard propulsors 14a, 14b respectively based on actuation of the port throttle/shift lever 35a.

If the Hybrid Mode Selection Button 37a is selected, the marine vessel 12 can operate in any of the Engine Mode, Electric Mode, or Hybrid Mode described above. The engines 18a, 18b and motors 16a, 16b are controlled by the control circuit 28 based upon actuation of the throttle/shift levers 35a, 35b, respectively. For example, the port engine 18a and port electric motor 16a selectively provide power to the port propulsor 14a based on actuation of the port throttle/shift lever 35a. Similarly, the starboard engine 18b and starboard electric motor 16b selectively provide power to the starboard propulsor 14b based on actuation of the starboard throttle/shift lever 35b. Selection between Engine Mode, Electric Mode and Hybrid Mode can be performed automatically by the control circuit 28 based upon actuation of the throttle/shift levers 35a, 35b and running characteristics of the marine vessel 12.

The present inventors have discovered that it would be desirable for the operator to have control over the selection of when and how the control circuit 28 carries out Engine Mode, Electric Mode, and Hybrid Mode. For example, an operator may desire to use all remaining charge left in the batteries 26 just as the operator arrives at his or her destination. The operator may also desire to selectively charge the batteries 26 to a desired level of charge. The operator may also desire to have control over how much "assist" is provided by the electric motors 16a, 16b to power the propulsors 14a, 14b while they are already being powered by the engines 18a, 18b. The present disclosure provides examples that accommodate these and other similar types of user-selective control.

In some examples, the control circuit 28 of the system 10 is programmed to control operation of the system 10 in at least first and second control modes. In the first control mode, the control circuit 28 controls operation of the engine 18a and motor 16a based on actuation of the port shift/throttle lever 35a. The control circuit 28 also controls operation of the engine 18b and motor 16b based on actuation of the throttle/shift lever 35b. This type of system is described herein above with respect to Engine Mode, Electric Mode, and Hybrid Mode, for example. In the second control mode, the control circuit 28 controls operation of the engines 18a, 18b based upon actuation of one of the throttle/shift levers 35a, 35b and controls operation of the motors 16a, 16b based upon actuation of the other of the throttle/shift levers 35a, 35b. In this manner, in the second control mode, the control circuit 28 is programmed to control shift position and throttle of the engines 18a, 18b based upon actuation of one of the throttle/shift levers 35a, 35b. Further, the control circuit 28 is programmed to operate the system 10 to apply power to the first and second propulsors 14a, 14b from the motors 16a, 16b based upon actuation of the other of the throttle/shift levers 35a, 35b in a first direction 5 (see FIG. 1) and to charge the batteries 26a, 26b, 26c connected to the motors 16a, 16b based upon actuation of the other of the throttle/shift lever 35a, 35b in a second direction 7 (see FIG. 1). In the second control mode, when both input devices 35a, 35b are actuated in the noted first direction 5, the control circuit 28 is programmed to operate the system 10 to power the first and second propulsors 14a, 14b respectively with the engines 18a, 18b and motors 16a, 16b. Further, in the second control mode, the control circuit 28 is programmed to operate the system 10 to power the propulsors 14a, 14b with the engines 18a, 18b respectively and to charge the batteries 26a, 26b, 26c when one of the throttle/shift levers 35a, 35b is actuated in the noted first direction 5 and the other throttle/shift lever 35a, 35b is actuated in the second direction 7.

Figure 4:
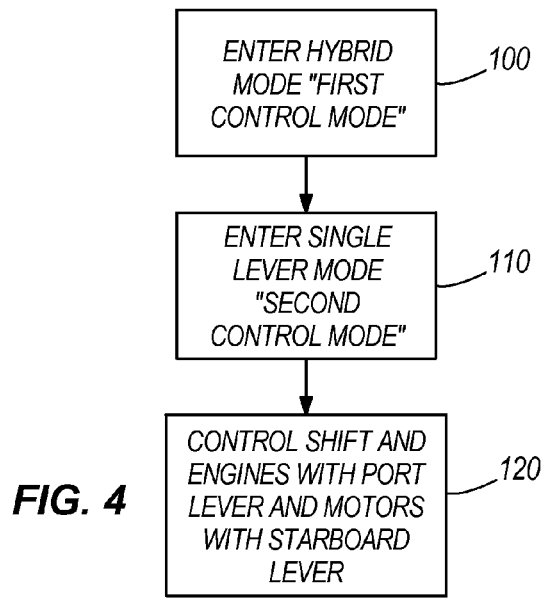
FIG. 4 is a flow chart illustrating one example of a method of operating a propulsion system for a marine vessel.

FIG. 4 depicts a method by which selective control over operation of a hybrid marine vessel 12 can be initiated. At 100, the system 10 enters Hybrid Mode, otherwise referred to herein as "First Control Mode". The system 10 can enter Hybrid Mode in response to, for example, selection of the Hybrid Mode Selection Button 37a provided at the user interface 30. Next, at 110, the system 10 enters single lever mode, otherwise referred to herein as "Second Control Mode". The system 10 can enter single lever mode in response to, for example, selection of the Single Lever Mode Selection Button 37b provided at the user interface 30. At 120, the system 10 controls engines 18a, 18b based on actuation of a first user input device, for example the port throttle/shift lever 35a, and the system controls the electric motors 16a, 16b based on actuation of a second user input device, for example the starboard throttle/shift lever 35b. The first and second user input devices need not be the port and starboard throttle/shift levers 35a, 35b, respectively, but could be reversed such that the control circuit 28 controls the engines 18a, 18b based on actuation of the starboard throttle/shift lever 35b and the control circuit 28 controls the electric motors 16a, 16b based on actuation of the port shift/throttle lever 35a. Further, control of the engines 18a, 18b and electric motors 16a, 16b could be based on actuation of one or more buttons, switches, and/or the like, instead of based on actuation of levers 35a, 35b.

Figure 5:
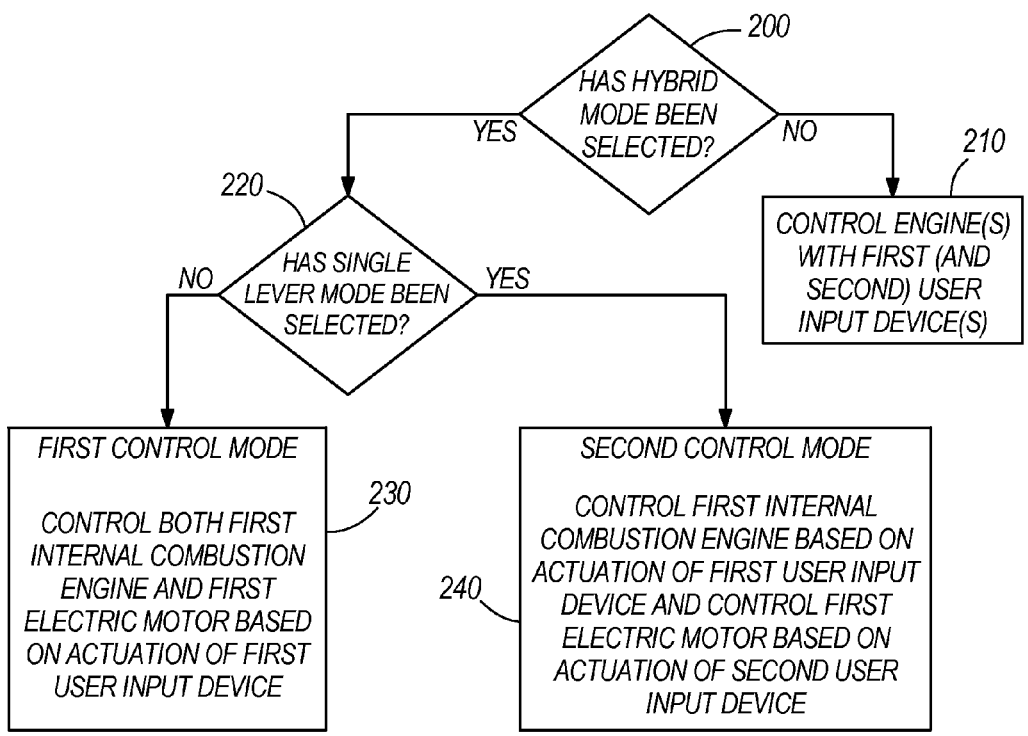
FIG. 5 is a flow chart illustrating another example of a method of operating a propulsion system for a marine vessel.

Another example is provided in FIG. 5. The control circuit 28 determines at step 200 whether Hybrid Mode has been selected, for example, by selection of the Hybrid Mode Selection Button 37a. If no, then at 210, the control circuit 28 controls the first and second internal combustion engines 18a, 18b with the first and second user input devices, such as the port and starboard throttle/shift levers 35a, 35b, respectively. If yes, then at 220, the control circuit 28 determines if single lever mode has been selected, for example, by selection of the Single Lever Mode Selection Button 37b. If no at 220, then at 230, the system enters First Control Mode, in which the control circuit 28 controls both the first internal combustion engine 18a and first electric motor 16a based on actuation of the first user input device. If the vessel 12 has a second internal combustion engine 18b and a second electric motor 16b, then both the second internal combustion engine 18b and the second electric motor 16b are controlled based on actuation of the second user input device in First Control Mode. If yes at 220, then at 240, the system 10 enters Second Control Mode, in which the control circuit 28 controls the first internal combustion engine 18a based on actuation of the first user input device and controls the first electric motor 16a based on actuation of the second user input device. If the vessel 12 has a second internal combustion engine 18b and a second electric motor 16b, then both the first internal combustion engine 18a and the second internal combustion engine 18b will be controlled based on actuation of the first user input device and both the first electric motor 16a and the second electric motor 16b will be controlled based on actuation of the second user input device in Second Control Mode.

Figure 6:
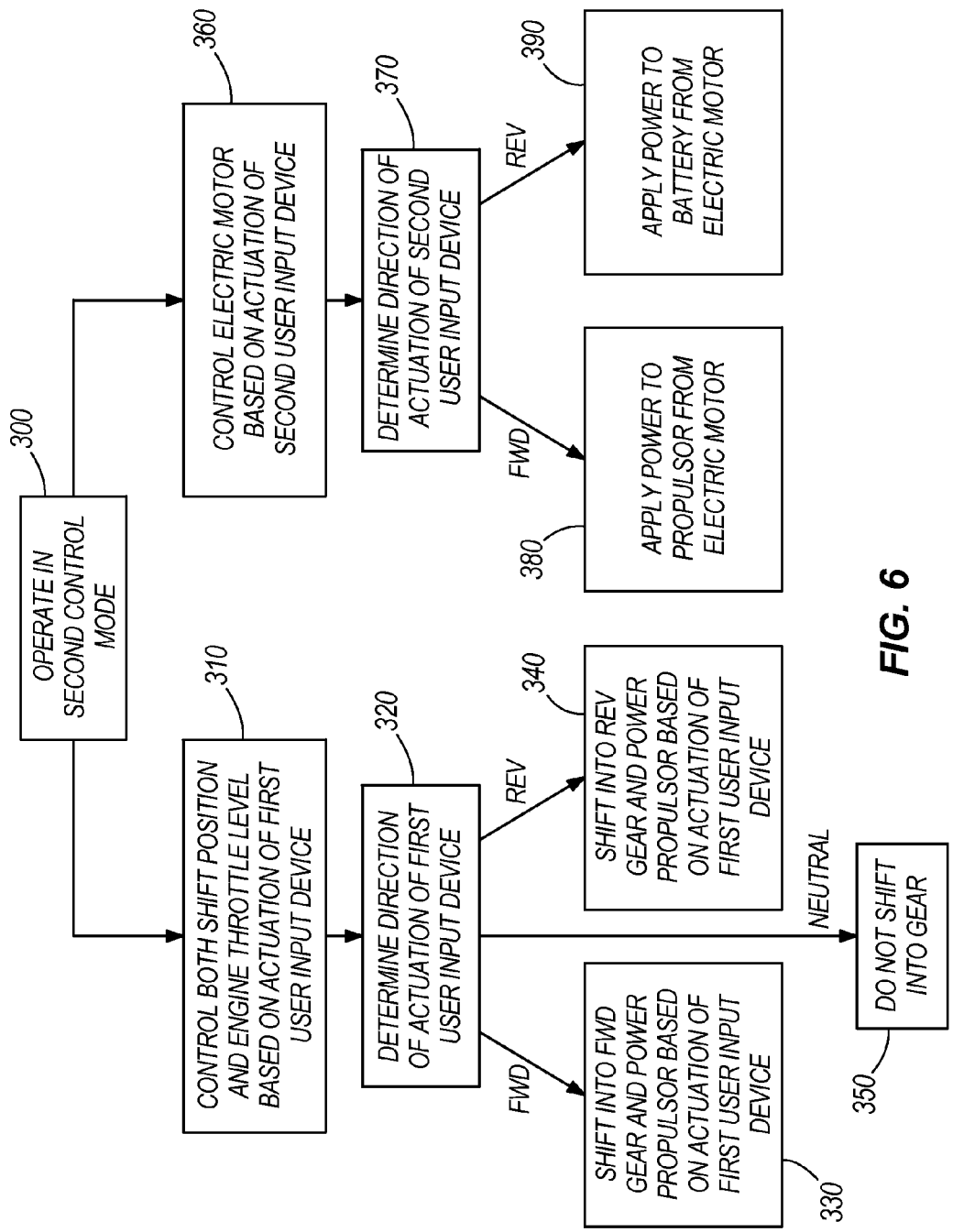
FIG. 6 is a flow chart illustrating another example of a method of operating a propulsion system for a marine vessel.

Another example is provided in FIG. 6. More detail regarding operation of the system 10 in Second Control Mode is provided. The system 10 enters Second Control Mode as shown at 300. At 310, the control circuit 28 controls both shift position and throttle of the engines 18a, 18b based on actuation of the first user input device, for example the port throttle/shift lever 35a. At 320, the control circuit 28 determines the direction of actuation of the first user input device. At 330, if the first user input device is actuated in a first direction, for example forward, the control circuit 28 shifts the system into forward gear and powers the propulsors 14a, 14b based on increasingly forward actuation of the first user input device. At 340, if the first user input device is actuated in a second direction, for example backward, the control circuit 28 shifts the system 10 into reverse gear and controls throttle of the engines 18a, 18b to thereby power the propulsors 14a, 14b based on increasingly backward actuation of the first user input device. As shown at 350, the control circuit 28 can alternatively control the system 10 to remain in neutral gear.

At the same time that the control circuit 28 controls the system at 310-350, the control circuit 28 controls the electric motors 16a, 16b based on actuation of the second user input device, for example the starboard throttle/shift lever 35b, as shown at 360. At 370 the control circuit 28 determines the direction of actuation of the second user input device. At 380, if the second user input device is actuated in a first direction, for example forward as shown by arrow 5 in FIGS. 1 and 2, then the control circuit 28 operates the system 10 to apply power to the propulsors 14a, 14b from the electric motors 16a, 16b respectively. Alternatively, if the second user input device is actuated in a second direction, for example backward as shown by arrow 7 in FIGS. 1 and 2, then the control circuit 28 operates the system 10 to charge the batteries 26 connected to the electric motors 16a, 16b.

In Second Control Mode, the system 10 described herein allows an operator to manually balance speed of the vessel 12, regeneration of the batteries 26, and fuel economy while underway based on different combinations of actuation of the first and second user input devices. For example, the system allows the operator to control the amount of battery charge remaining once a trip destination has been reached. The operator can determine from the display/input screen 38 the amount of remaining battery charge; the amount of remaining fuel; and, based on information from the GPS receiver 41, the amount of time until a destination is reached. The operator can use this information to selectively apply power to the propulsors 14a, 14b with either or both of the internal combustion engines 18a, 18b and electric motors 16a, 16b.

For instance, while underway in forward gear under the power of the engines 18a, 18b, the operator can actuate the second user input device in the second direction (i.e., backward, arrow 7) to charge the batteries 26 with the electric motors 16a, 16b acting as generators. Thus, the system allows for manual regeneration of the batteries 26 while the vessel is underway. The requested regeneration will be limited by the CCM 28a' based on the amount of torque the engines 18a, 18b are capable of producing at their ratings. This safely allows the user to manually request torque from the internal combustion engine powertrain while consuming torque from the electrical powertrain.

As another example, if the operator desires to run the vessel 12 under the power of the electric motors 16a, 16b, the operator can place the first user input device in forward or reverse gear, such as for example by placing the first throttle/shift lever 35a in a forward or reverse detent position, and actuate the second user input device in the first direction (i.e., forward, arrow 5) to apply power from the electric motors 16a, 16b to the propulsors 14a, 14b. The examples provided above are not meant to be limiting, as many other manually-selected combinations of engine and motor power are possible and fall within the scope of the present disclosure.

What is claimed is:

1. A hybrid propulsion system for a marine vessel, the system comprising:
    a first marine propulsor that is configured to propel the marine vessel;
    a first internal combustion engine that is configured to selectively power the first marine propulsor;
    a first electric motor that is configured to selectively power the first marine propulsor;
    a second internal combustion engine and a second electric motor that are configured to selectively power a second marine propulsor;
    first and second user input devices; and
    a control circuit that is configured to control operation of the system in at least a first control mode and a second control mode;
    wherein in the first control mode, the control circuit is configured to control operation of the first internal combustion engine and the first electric motor based upon actuation of the first user input device, and the control circuit is configured to control operation of the second internal combustion engine and the second electric motor based upon actuation of the second user input device;
    wherein in the second control mode, the control circuit is configured to control operation of the first internal combustion engine and the second internal combustion engine based upon actuation of the first user input device, and the control circuit is configured to control operation of the first electric motor and the second electric motor based upon actuation of the second user input device;
    wherein in the second control mode, the control circuit is configured to operate the system to apply power to the first and second propulsors from the first and second electric motors respectively based on actuation of the second user input device in a first direction and to charge a battery connected to the first and second electric motors based on actuation of the second user input device in a second direction.

2. A hybrid propulsion system according to claim 1, wherein in the second control mode, the control circuit is configured to operate the system to power the first and second propulsors with the first and second internal combustion engines and the first and second electric motors respectively when the first user input, device and the second user input device are actuated in the first direction.

3. A hybrid propulsion system according to claim 1, wherein in the second control mode, the control circuit is configured to operate the system to power the first and second propulsors with the first and second internal combustion engines respectively and to charge the battery when the first user input device is actuated in the first direction and the second user input device is actuated in the second direction.

4. A method of operating, a marine propulsion system having, first and second internal combustion engines and first and second electric motors, wherein the first internal combustion engine and the first electric motor each is configured to selectively power a first marine propulsor to propel a marine vessel, and wherein the second internal combustion engine and the second electric motor each is configured to selectively power a second marine propulsor to propel the marine vessel, the method comprising:

controlling both the first internal combustion engine and the first electric motor based on actuation of a first user input device according to a first control mode; and controlling both the second internal combustion engine and the second electric motor based on actuation of a second user input device according to the first control mode;

controlling the first and second internal combustion engines based on actuation of the first user input device and controlling the first and second electric motors based on actuation of the second user input device according to a second control mode; and operating the system in the second control mode to apply power to the first and second propulsors from the first and second electric motors respectively based on actuation of the second user input device in a first direction and to charge a battery connected to the first and second electric motors based on actuation of the second user input device in a second direction.

5. A method according to claim 4, further comprising operating the system in the second control mode to power the first and second propulsors with the first and second internal combustion engines and the first and second electric motors respectively when the first user input device and the second user input device are actuated in the first direction.

6. A method according to claim 4, further comprising operating the system in the second control mode to power the first and second propulsors with the first and second internal combustion engines respectively and to charge the battery when the first user input device is actuated in the first direction and the second user input device is actuated in the second direction.

* * * * *

UNITED STATES PATENT AND TRADEMARK OFFICE
CERTIFICATE OF CORRECTION

PATENT NO. : 8,992,274 B1  Page 1 of 1
APPLICATION NO. : 13/524172
DATED : March 31, 2015
INVENTOR(S) : Ward et al.

It is certified that error appears in the above-identified patent and that said Letters Patent is hereby corrected as shown below:

In the Claims

Claim 2, Column 9, Line 8: delete "," between "input" and "device".

Claim 4, Column 9, Line 18: delete "," between "operating" and "a".

Claim 4, Column 9, Line 19: delete "," between "having" and "first".

Signed and Sealed this
Twenty-eighth Day of July, 2015

Michelle K. Lee
*Director of the United States Patent and Trademark Office*